Figure 1:
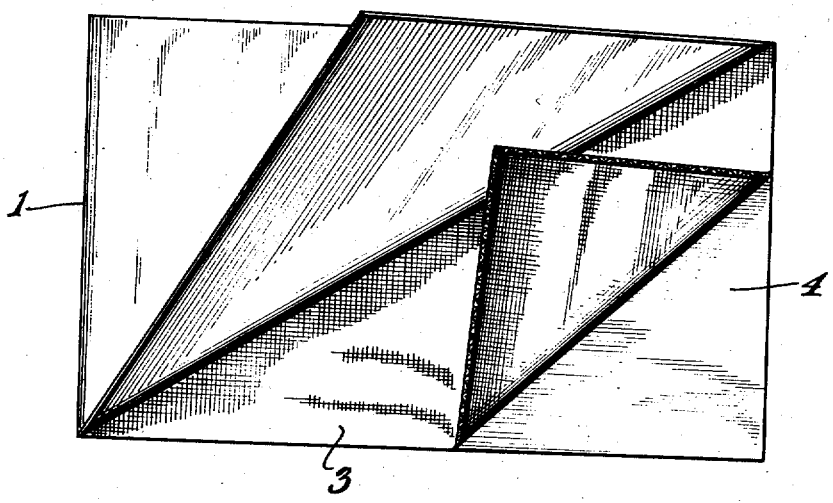

Nov. 29, 1932. S. RUBEN Re. 18,673

ELECTROSTATIC CONDENSER

Original Filed Aug. 22, 1927

INVENTOR
Samuel Ruben
BY
Watson, Bristol, Johnson & Leavenworth
ATTORNEYS

Reissued Nov. 29, 1932

Re. 18,673

UNITED STATES PATENT OFFICE

SAMUEL RUBEN, OF NEW ROCHELLE, NEW YORK, ASSIGNOR, BY MESNE ASSIGNMENTS, TO RUBEN CONDENSER COMPANY, OF NEW ROCHELLE, NEW YORK, A CORPORATION OF DELAWARE

ELECTROSTATIC CONDENSER

Original No. 1,714,319, dated May 21, 1929, Serial No. 214,777, filed August 22, 1927. Application for reissue filed May 5, 1931. Serial No. 535,271.

This invention relates to electro-static condensers; its object is to provide a high capacity condenser of high efficiency. Another object is to provide a condenser having high capacitance when used in alternating current circuits.

The condenser of my invention depends for operation upon an electrolytically formed current-blocking layer. In the prior art there are electrolytically formed condensers of two types, the gas layer polarized cell type and the electrolytically formed film layer type. The polarized cell type operates below the decomposition potential of the solution by employing the polarized effect of a gas layer at its electrode surface; the latter type, as exemplified by those using aluminum electrodes, employs a current-blocking film of a composite gas layer and hydroxide or oxide film; they use a film-forming compound either in the form of a solution or a paste mixture, the ohmic resistance of the electrolyte being relatively high. For uses on power filter circuits where efficiency and high capacitances are desirable, both of these devices have undesirable limitations. The condenser of my invention has the equivalent of a metallic conductive path, that is by the finely divided conductive metal particles, such as copper, which are in such close contact as to give a low internal resistance. It is of the film-forming type having a specific kind of electrolyte, which is a film-forming composition, the electrodes being separated by a porous retiform spacer. The combination gives a condenser of large electrostatic capacity and high efficiency.

I have found that copper powder mixed with a saturated solution of potassium fluoride contacting with the electrodes forms a film which is a current-blocking layer when connected as the anode in a circuit, and that an efficient condenser is made up of copper plate electrodes having therebetween a thin layer of such a mixture. A current-blocking coating is quickly formed about the surface of the copper particles with the discharge of current, thus giving a wide contact resistance area at the electrode surfaces. To maintain a uniform salt conductivity a slight amount of glycerin or other hygroscopic material may be added. To insure the continued even distribution of the electrolyte, this element is preferably spread over the surface of a suitable porous or reticular spacer, such as a cotton gauze material preferably dipped in paraffin.

As the electrolyte used enables the quick reformation of current-blocking coatings after its penetration by an excessive discharge, the device is self-healing and in addition to being adapted as a condenser, is also well adapted for use as a lightning arrester.

Figure 2:
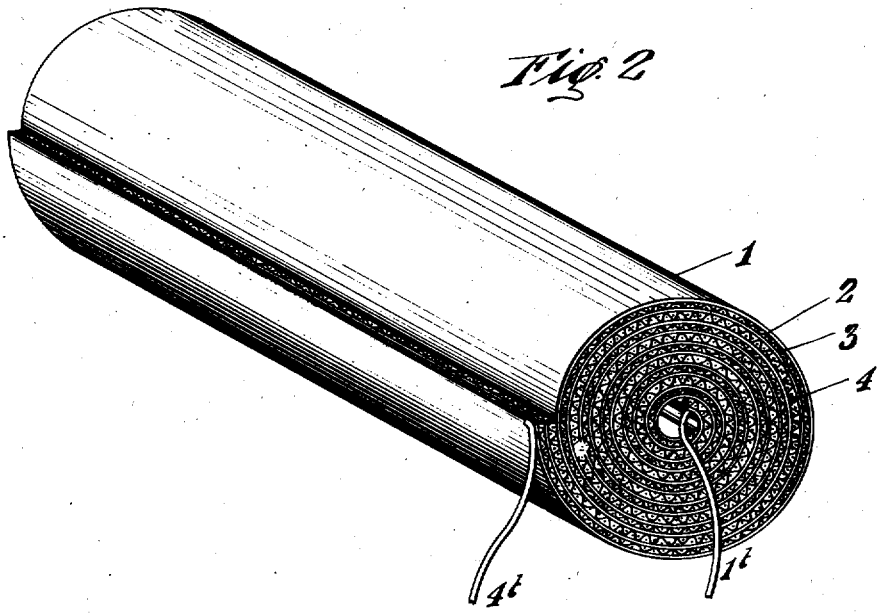

Reference is made to the accompanying drawing showing one embodiment of the invention, in which Fig. 1 shows a flat plate form of condenser and Fig. 2 a condenser having its elements in coil form. In Fig. 1, 1 and 4 represent copper plate electrodes and 3 a cloth spacer which is impregnated with an electrolyte containing finely divided copper powder. On the adjacent surfaces of the electrodes an electrolytically formed film covers the areas contacting with the electrolyte. In Fig. 2 those elements are represented by corresponding figures, 2 showing the electrolyte applied to the spacer between the electrodes.

The condenser has been described as employing copper electrodes with a film-forming electrolyte containing copper particles. However, other metals, such as aluminum, magnesium, silver and tantalum, are also applicable with small particles of metal mixed with a suitable separating film-forming electrolyte.

An electrolyte of a fluoride set forth is suitable for use with any of the valve metals mentioned but other film-forming electrolytes obviously may be used. With aluminum or tantalum an electrolyte of boric acid and a salt thereof may be used with which may be mixed, if desired, a viscous material such as a polyhydric alcohol, for example a glycol or a glycerol. A specific example of a suitable electrolyte for aluminum or tantalum is sodium bicarbonate, boric acid and glycerine. With magnesium an electrolyte of potassium chloride may be used advantageously. Any electrolyte which has been found prior to the present invention as being suitable with any of the valve metals set forth above is useful in the condensers of the present invention since the incorporation in the electrolyte of fine particles of valve metal makes no special demands upon the specific characteristics of the electrolyte.

Having described my invention, what I claim as new and desire to secure by Letters Patent, is:

1. An electrical condenser comprising electrodes of a metal which will respond to electrolytic action in a manner to form a composite partially solid current-blocking film thereon having in surface contact therebetween a mixture of fine particles of the same metal which will respond to electrolytic action in a manner to form a current blocking film thereon and a film-forming electrolyte.

2. An electrical condenser comprising metallic plate electrodes which will respond to electrolytic action in a manner to form a composite partially solid current-blocking film thereon having in surface contact therebetween a mixture of fine particles of the same metal capable of being film-formed and a film-forming electrolyte held in suspension by porous spacer material.

3. An electrical condenser comprising metallic plate electrodes which will respond to electrolytic action in a manner to form a composite partially solid current-blocking film thereon having in surface contact therebetween a mixture composed of fine particles of the same metal and a film-forming electrolyte held in suspension by a reticular body.

4. An electrical condenser comprising metallic plate electrodes which will respond to electrolytic action in a manner to form a current-blocking film thereon having in surface contact therebetween a mixture of fine particles of the same metal and a film-forming electrolyte of a fluoride.

5. An electrical condenser comprising copper plate electrodes having in surface contact therebetween a mixture composed of copper particles and a film-forming electrolyte of a fluoride.

6. An electrical condenser comprising copper plate electrodes having in surface contact therebetween a mixture composed of copper particles and a film-forming electrolyte of a fluoride held in suspension by a reticular body.

7. An electrical condenser comprising copper plate electrodes having in surface contact therebetween a mixture of small particles of copper in a solution of potassium fluoride.

8. An electrical condenser comprising copper plate electrodes having in surface contact therebetween copper particles and an electrolyte of potassium fluoride held under suspension by a spacer in reticular form.

9. An electrical condenser comprising an anode of a metal which will respond to electrolytic action in a manner to form a composite partially solid current-blocking film and a mixture of a film-forming electrolyte and fine particles of the same metal from which the anode is formed in surface contact with said anode.

In testimony whereof I affix my signature.

SAMUEL RUBEN.